United States Patent
Lu et al.

(10) Patent No.: US 10,165,552 B2
(45) Date of Patent: Dec. 25, 2018

(54) LINK ADAPTATION FOR DEVICE-TO-DEVICE COMMUNICATION

(75) Inventors: Qianxi Lu, Beijing (CN); Qingyu Miao, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 14/424,279

(22) PCT Filed: Aug. 27, 2012

(86) PCT No.: PCT/CN2012/080619
§ 371 (c)(1),
(2), (4) Date: Feb. 26, 2015

(87) PCT Pub. No.: WO2014/032222
PCT Pub. Date: Mar. 6, 2014

(65) Prior Publication Data
US 2015/0208401 A1 Jul. 23, 2015

(51) Int. Cl.
*H04W 72/04* (2009.01)
*H04W 72/08* (2009.01)
(Continued)

(52) U.S. Cl.
CPC ........ *H04W 72/0406* (2013.01); *H04W 76/11* (2018.02); *H04W 76/14* (2018.02); *H04W 72/082* (2013.01)

(58) Field of Classification Search
CPC ........................ H04W 72/0406; H04W 72/082
(Continued)

(56) References Cited

U.S. PATENT DOCUMENTS

2010/0056215 A1* 3/2010 Gorokhov .............. H04B 7/024
455/561
2011/0275382 A1* 11/2011 Hakola ................. H04W 24/10
455/452.2
(Continued)

FOREIGN PATENT DOCUMENTS

WO WO-2010049801 A1 5/2010
WO WO-2010082084 A1 7/2010
(Continued)

OTHER PUBLICATIONS

PCT Notification Concerning Transmittal of International Preliminary Report on Patentability (Chapter I), for PCT Counterpart Application. No. PCT/CN2012/080619, dated Mar. 12, 2015, 11 pages.
(Continued)

*Primary Examiner* — Joshua L Schwartz
(74) *Attorney, Agent, or Firm* — Nicholson De Vos Webster & Elliott LLP (57) ABSTRACT

A method, a user equipment, and a base station for link adaptation in a hybrid device-to-device device (D2D) and cellular network are provided. The method comprises receiving, by at least one of two D2D user equipment (UEs) in D2D communication, resource allocation information and assistance information from a base station (BS), wherein the assistance information is used to divide resources conveyed by the resource allocation information into different types based upon correspondingly different interference sources. The method further comprises performing respective link adaptation based upon the respective different types of resources. With the present invention, better high quality communication links can be achieved. Furthermore, resource allocation in the hybrid network could be improved and becomes more efficient over the prior art.

15 Claims, 5 Drawing Sheets

(51) Int. Cl.
*H04W 76/11* (2018.01)
*H04W 76/14* (2018.01)

(58) Field of Classification Search
USPC .............................. 455/452.1, 453; 370/310
See application file for complete search history.

(56) References Cited

U.S. PATENT DOCUMENTS

| | | | |
|---|---|---|---|
| 2012/0093098 A1 | 4/2012 | Charbit et al. | |
| 2014/0256334 A1* | 9/2014 | Kazmi | H04W 28/18 |
| | | | 455/450 |

FOREIGN PATENT DOCUMENTS

| | | |
|---|---|---|
| WO | WO-2011050519 A1 | 5/2011 |
| WO | WO-2011069295 A1 | 6/2011 |
| WO | WO-2011124015 A1 | 10/2011 |
| WO | WO-2011151508 A1 | 12/2011 |
| WO | WO-2013067685 A1 | 5/2013 |
| WO | WO-2013134891 A1 | 9/2013 |
| WO | WO 2014/092619 | 6/2014 |

OTHER PUBLICATIONS

PCT International Search Report and the Written Opinion of the International Searching Authority for PCT Counterpart Application No. PCT/CN2012/080619, (dated May 30, 2013), 18 pages.

Extended European Search Report, EP Application No. 12883887.7, dated Mar. 4, 2016, 6 pages.

Shaoyi Xu et al., "Effective Labeled Time Slots based D2D Transmission in Cellular Downlink Spectrums," May 16, 2010, 5 pages, 2010 IEEE Vehicular Technology Conference.

Communication pursuant to Article 94(3) EPC for European Application No. 12883887.7, dated Mar. 9, 2017, 4 pages.

First Office Action and Search Report from foreign counterpart China Patent Application No. 201280075436.6, dated Jul. 12, 2017, 23 pages.

Second Office Action from foreign counterpart China Patent Application No. 201280075436.6, dated Jan. 30, 2018, 8 pages.

Communication pursuant to Article 94(3) EPC for European Application No. 12883887.7, dated Jul. 4, 2018, 5 pages.

Doppler K., et al., "Mode Selection for Device-To-Device Communication Underlaying an LTE-Advanced Network," Wireless Communications and Networking Conference (WCNC), IEEE, Apr. 18-21, 2010, 6 pages.

* cited by examiner

LINK ADAPTATION FOR DEVICE-TO-DEVICE COMMUNICATION

CROSS-REFERENCE TO RELATED APPLICATIONS

This application is a National stage of International Application No. PCT/CN2012/080619, filed Aug. 27, 2012, which is hereby incorporated by reference.

BACKGROUND

Field

Certain exemplary embodiments of the present invention relate generally to communication systems, and more particularly, to a direct device-to-device (D2D) communication integrated into a cellular network, such as a long-term evolution (LTE) or long-term evolution advanced (LTE-A) cellular network specified by the 3rd Generation Partnership Project (3GPP).

Description of the Related Art

Various abbreviations that appear in the specification and/or in the drawing figures are defined as below:
ACK Acknowledgement
BSR Buffer Status Report
CQI Channel Quality Indicator
C-RNTI Cell-Radio Network Temporary Identifier
CS Cyclic Shift
D2D Device-to-Device
DL Downlink
DCI Downlink Control Information
eNB evolved Node B
HARQ Hybrid Automatic Repeat Request
LA Link Adaptation
LTE Long Term Evolution
MCS Modulation and Coding Scheme
NACK Negative Acknowledgement
RRM Radio Resource Management
RS Reference Signal
RSRP Reference Signal Received Power
Rx Receiver
SINR Signal to Interference Plus Noise Ratio
Tx Transmitter
UL Uplink Wireless communication systems are under constant development and continuing efforts are made to increase the performance and efficiency within such systems. In view of this, a promising feature of future wireless communication systems comprises direct communication between UEs in close proximity of each other, e.g., within a distance of a few tens or hundred meters. In future hybrid networks, a UE may be in a direct D2D mode in addition to a cellular mode. The D2D mode enables a number of potential gains over the traditional cellular technique, for example, capacity gains, peak rate gains and latency gains.

Take 3GPP LTE as an example, the D2D communication is set forth as an underlay to LTE cellular network operation, wherein both the cellular communication and the D2D communication use the same communication resources. In the D2D mode, the UE may communicate directly with another UE, and in the cellular mode, it may communicate with the other UE via a centralized controller in a conventional manner. The centralized controller is such as a BS, a Node B, or an eNB. For a better understanding and easy discussion of the D2D communication, description will be made with reference to FIG. 1.

Figure 1:
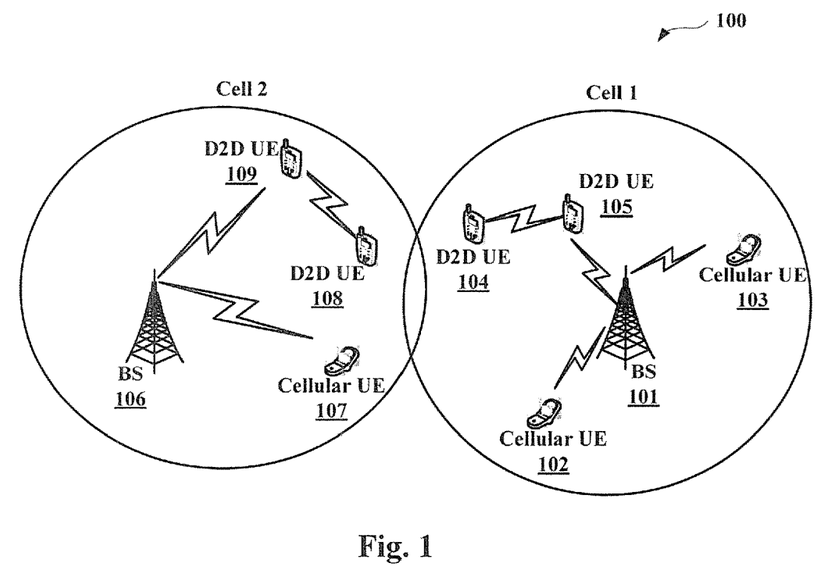
FIG. 1 illustrates an example of a communication system in which certain embodiments of the present invention can be practiced.

FIG. 1 illustrates an example of a communication system 100 in which certain embodiments of the present invention can be practiced. As illustrated in FIG. 1, the communication system 100 comprises two cells (Cell 1 and Cell 2) which respectively include BSs 101 and 106 and are depicted in circles. Although two cells are illustrated, as one of ordinary skill would readily appreciate, the system 100 can include any number of cells. Within the coverage areas of the BSs 101 and 106 are seen a plurality of UEs, including D2D and cellular types of UEs. In the coverage area of the BS 101, D2D UEs 104 and 105 are communicating with each other in a D2D mode and cellular UEs 102 and 103 are communicating with or via the BS 101 in a cellular mode. The similar also occurs within the coverage area of the BS 106.

As seen from FIG. 1, due to their close proximity, D2D UEs in the D2D communication might confront with different interference from different sources. For example, a pair of D2D UEs in the D2D communication may be subject to interference from other D2D UEs. Also, the pair of D2D UEs at issue may be subject to interference from cellular UEs that are in cellular communication via the BS. Take the D2D UEs 104 and 105 as examples, if they are assigned (or reuse) the same radio resource as the cellular UE 102 or 103, they may be subject to interference from the cellular UE 102 or 103. Further, if they are allocated the same radio resources as the D2D UE 108 or 109 or cellular UE 107 in the neighboring cell (i.e., Cell 2), they may experience interference from the neighboring cell. This may lead to a problem of how to properly allocate radio resources and efficiently perform LA in view of the above-mentioned interference, especially in such a hybrid network including a cellular network and a D2D network.

SUMMARY

To address the above potential problem, certain embodiments of the present invention would provide for an efficient way of performing the LA at the D2D UE and allocating the radio resources based upon a result of the LA, thereby achieving high quality communication links between D2D UEs and improving usage efficiency of radio resources.

According to an embodiment of the invention, a method for link adaptation in a hybrid D2D and cellular network is provided. The method comprises receiving, by at least one of two D2D UEs in D2D communication, resource allocation information and assistance information from a BS, wherein the assistance information is used to divide resources conveyed by the resource allocation information into different types based upon correspondingly different interference sources. The method further comprises performing respective LA based upon the respective different types of resources.

According to another embodiment, a method for link adaptation in a hybrid D2D and cellular network. The method comprises transmitting, by a BS, resource allocation information and assistance information to at least one D2D UE in D2D communication, wherein the assistance information is used to divide resources conveyed by the resource allocation information into different types based upon correspondingly different interference sources. The method further comprises receiving, from the at least one D2D UE, at least one report resulted from respective LA performed by the at least one D2D UE, wherein the respective LA has been performed based upon the respective different types of resources. The method additionally comprises updating the resource allocation information based upon at least one report.

According to another embodiment, a UE is provided. The UE comprises a receiver, adapted to receive resource allocation information for D2D communication and assistance information from a BS, wherein the assistance information is used to divide resources conveyed by the resource allocation information into different types based upon correspondingly different interference sources. The UE further comprises a performing module, adapted to perform respective LA based upon the respective different types of resources.

According to a further embodiment, a BS is provided. The BS comprises a transmitter, adapted to transmit, resource allocation information and assistance information to at least one D2D UE in D2D communication, wherein the assistance information is used to divide resources conveyed by the resource allocation information into different types based upon correspondingly different interference sources. The BS further comprises a receiver, adapted to receive, from the at least one D2D UE, at least one report resulted formed respective LA performed by the at least one D2D UE, wherein the respective link adaptation has been performed based upon the respective different types of resources. The BS additionally comprises an updating module, adapted to update the resource allocation information based upon at least one report.

According to the foregoing embodiments of the present invention, different interference sources are taken into account when performing the LA, thereby achieving high quality communication links. Furthermore, the resource allocation in the hybrid network could be improved and becomes more efficient over the prior art.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Embodiments of the invention will be described thoroughly hereinafter with reference to the accompanied drawings. It will be apparent to those skilled in the art that the invention may, however, be embodied in many different forms and should not be construed as limited to the embodiments and specific details set forth herein. Like numbers refer to like elements throughout the specification.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the invention may be applied in various wireless networks, such as WCDMA, GSM, and 3GPP LTE etc. Given the rapid development in communications, there will of course also be future type wireless communication technologies and systems with which the present invention may be embodied. It should not be seen as limiting the scope of the invention to only the aforementioned system.

In the context of the disclosure, for example, the term "base station" is exemplified with an eNB, it is not intended to limit the scope of the base station only to the eNB, but includes radio devices capable of implementing the similar function as employed according to the embodiments of the present invention. Also, in the general context of the invention, the term "D2D" generally refer to a direct device-to-device communication which allows direct communication between closely located UEs instead of conveying data from one device to the other via the radio and core network (e.g., BS). Furthermore, resources according to embodiments of the present invention may include but are not limited to a time domain, a frequency domain, a code domain, a spatial domain, or a combination of such domains.

To obtain a high quality communication link and efficient resource allocation, the embodiments of the present invention propose sending from an eNB to the at least one D2D UE D2D resource scheduling or allocation information together with assistance information. The assistance information can be used to differentiate idle resources and resources interfered by different cellular UEs. Furthermore, the assistance information can be extended to differentiate resources with/without interference from the cellular/D2D UEs in the serving/neighboring cells. Upon receipt of the scheduling information and assistance information, the D2D UE may accomplish the LA autonomously and additionally report the result of the LA to the eNB for its subsequent resource allocation. Based upon the updated resource allocation, the eNB may better the resource scheduling for served D2D UEs and cellular UEs.

FIG. 1 illustrates an example of a communication system 100 in which certain embodiments of the present invention can be practiced. Details regarding the communication system 100 have been described previously and thus further description is omitted herein for a concise purpose.

Figure 2:
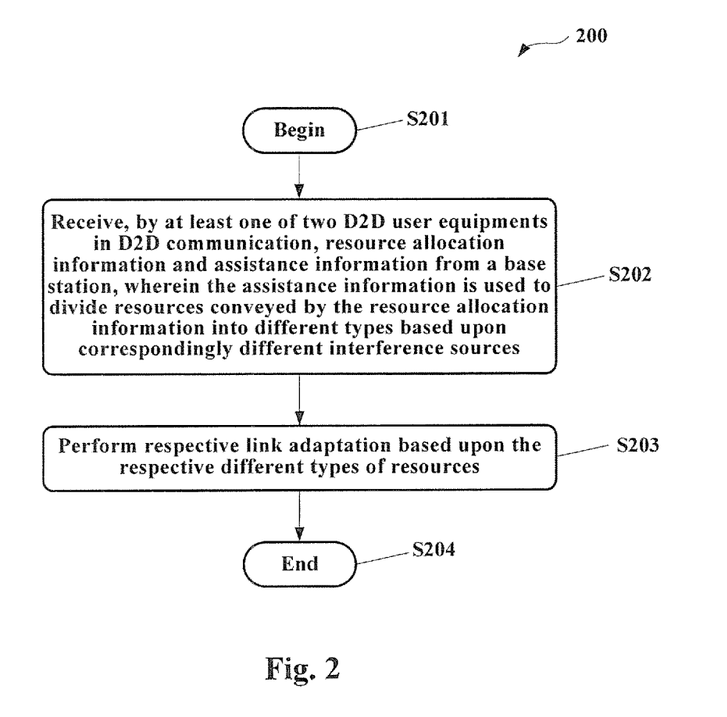
FIG. 2 schematically illustrates a method for LA in a hybrid D2D and cellular network according to an embodiment of the present invention.

FIG. 2 schematically illustrates a method 200 for LA in a hybrid D2D and cellular network according to an embodiment of the present invention. As illustrated in FIG. 2, the method 200 begins at step S201 and proceeds to step S202, at which the method 200 receives, by at least one of two D2D UEs (e.g., D2D UEs 104 and 105 in FIG. 1) in D2D communication, resource allocation information and assistance information from a BS (e.g., BS 101), wherein the assistance information is used to divide resources conveyed by the resource allocation information into different types based upon correspondingly different interference sources. Upon receipt of the resource allocation information and assistance information from the BS, the method 200 proceeds to step S203, at which the method 200 performs respective LA based upon the respective different types of resources. Finally, the method 200 ends at step S204.

Although not shown in FIG. 1, in an embodiment, the different interference sources comprise at least one of the following: (1) different cellular UEs (e.g., the cellular UEs 102 and 103) in a same cell (e.g., the Cell 1) as the two D2D UEs (e.g., the D2D UEs 104 and 105); (2) different cellular UEs (e.g., the cellular UE 107) in a neighboring cell (e.g., the Cell 2) relative to a serving cell of the two D2D UEs; (3) different D2D UEs in other D2D communication in a same cell as the two D2D UEs; (4) different D2D UEs ((e.g., the D2D UEs 108 and 109) in a neighboring cell relative to the serving cell of the two D2D UEs.

In one embodiment, the method 200 performs the respective LA based upon respective channel quality information obtained from the respective D2D communication on the respective different types of resources. In another embodiment, the respective channel quality information comprises information regarding a channel quality indicator and one of an ACK and a NACK (e.g., a HARQ ACK or NACK) to receipt of the respective D2D communication on the respective different types of resources.

In an embodiment, the method 200 reports, subsequent to the respective LA, to the BS to indicate a mapping relationship between a physical resource and a data bit as a result of the respective LA. In one embodiment, the mapping relationship may relate to the number of physical resources to be needed to clear a transmit buffer of the at least one D2D UE. In another embodiment, the mapping relationship may relate to the number of physical resources occupied per bit or the number of data bits carried per physical resource. This mapping relationship can be advantageously applied by the BS to a finer resource allocation, thereby achieving a better resource allocation performance.

In an embodiment, the method 200 performs at least one of respective upstream and downstream LA by one of the two D2D UEs acting as a master device in the D2D communication. For example, the D2D UE 104 may act as a master device in the D2D communication with the D2D UE 105.

With the method 200 according to the above embodiments of the present invention, an interference source specific LA scheme can be implemented by D2D UEs in a distributed manner. Further, by reporting to the BS the results of the LA, good coordination between the resource allocation at the BS and the LA at the D2D UE can be realized.

Figure 3:
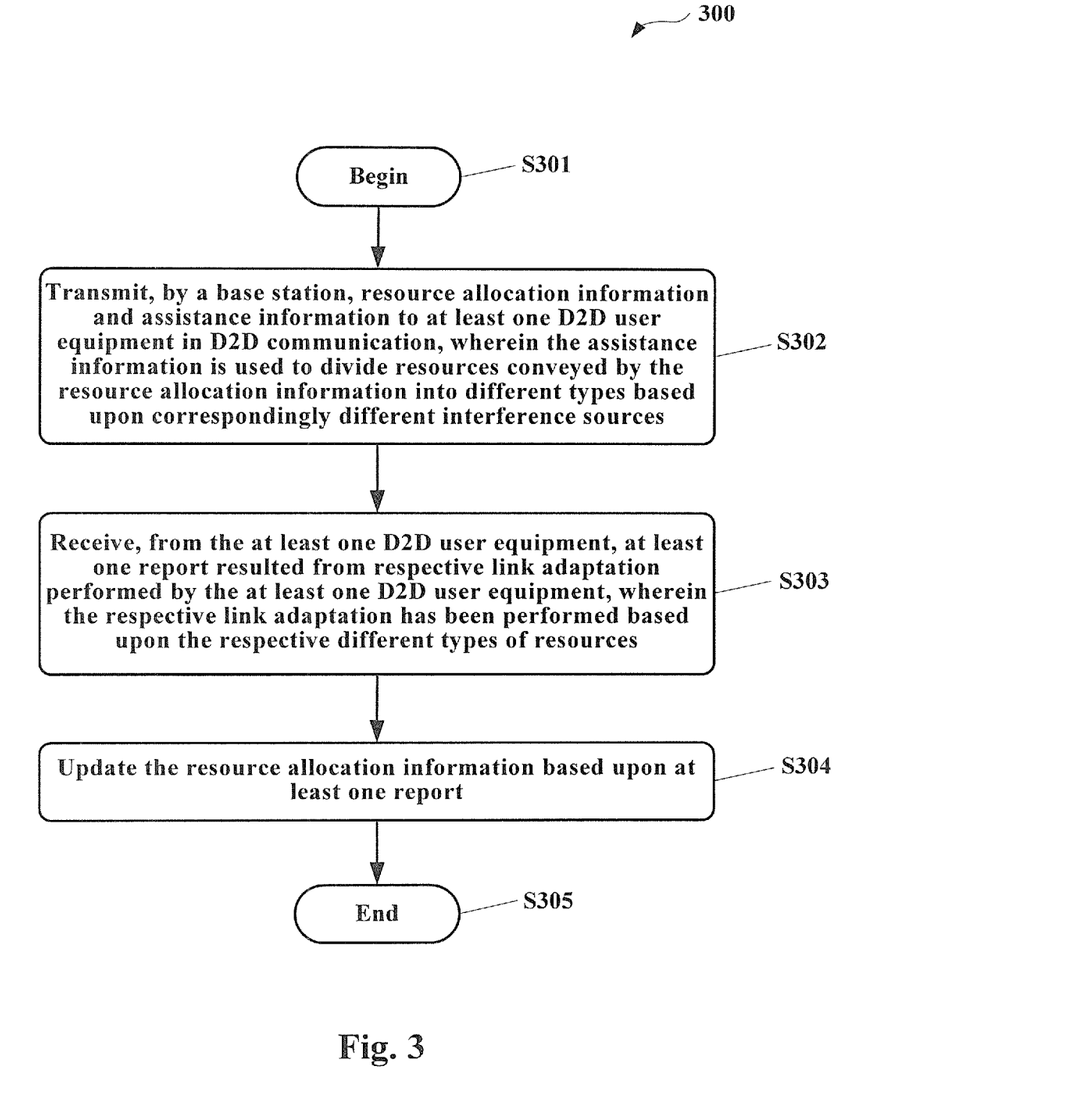
FIG. 3 schematically illustrates a method for LA in a hybrid D2D and cellular network according to an embodiment of the present invention.

FIG. 3 schematically illustrates a method 300 for LA in a hybrid D2D and cellular network according to an embodiment of the present invention. As illustrated in FIG. 3, the method 300 begins at step S301 and proceeds to step S302, at which the method 300 transmits, by a BS (e.g., BS 101 or 106 in FIG. 1), resource allocation information and assistance information to at least one D2D UE in D2D communication, wherein the assistance information is used to divide resources conveyed by the resource allocation information into different types based upon correspondingly different interference sources.

Following transmission of the resource allocation information and assistance information, the method 300 proceeds to step S303, at which the method 300 receives, from the at least one D2D UE, at least one report resulted from respective LA performed by the at least one D2D UE, wherein the respective LA has been performed based upon the respective different types of resources.

Upon receiving the at least one report, the method 300 updates the resource allocation information based upon at least one report at step S304. Finally, the method 300 ends at step S305.

Although not illustrated in FIG. 3, similar to the method 200, in an embodiment, the different interference sources comprise at least one of the following: different cellular UEs in a same cell as the two D2D UEs or in a neighboring cell relative to a serving cell of the two D2D UEs; and different D2D UEs in other D2D communication in a same cell as the two D2D UEs or in a neighboring cell relative to the serving cell of the two D2D UEs. In one embodiment, the at least one report indicates a mapping relationship between a physical resource and a data bit as a result of the respective LA. In one embodiment, the mapping relationship may relate to the number of physical resources to be needed to clear a transmit buffer of the at least one D2D UE. In another embodiment, the mapping relationship may relate to the number of physical resources occupied per bit or the number of data bits carried per physical resource.

With the method 300 according to the above embodiments, the BS may properly and precisely determine how many resources are needed for the D2D communication and thus make appropriate resource allocation in the subsequent scheduling.

Figure 4:
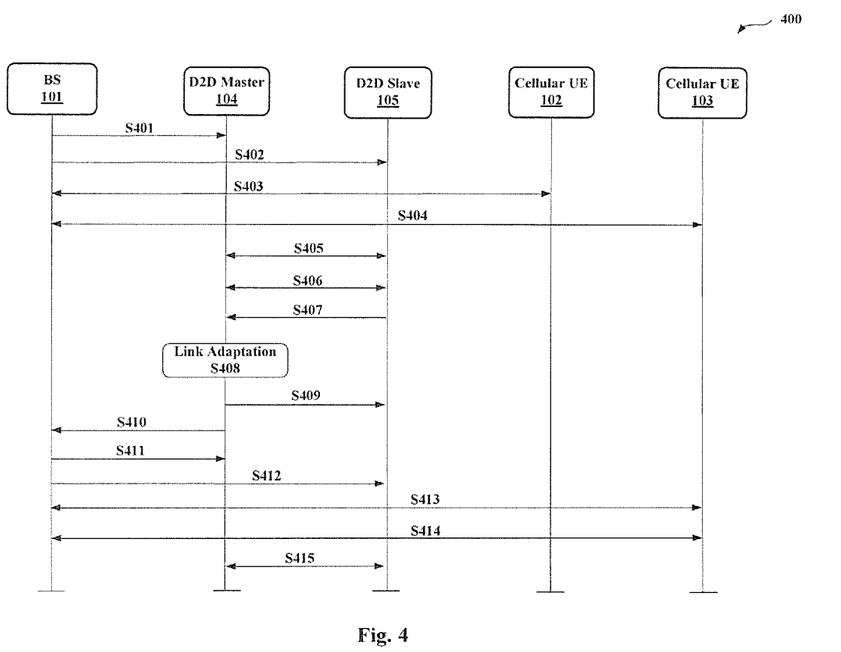
FIG. 4 schematically illustrates a signaling flow for a method for LA in a hybrid D2D and cellular network according to an embodiment of the present invention.

FIG. 4 schematically illustrates a signaling flow for a method 400 for LA in a hybrid D2D and cellular network according to an embodiment of the present invention. As illustrated in FIG. 4, subsequent to initial channel measurements, a BS 101 schedules a D2D master UE 104 and a D2D slave UE 105 at steps S401, S402, respectively. With respect to the initial channel measurements, the BS 101 may collect D2D related radio resource channel information, which may include the information regarding D2D/cellular links, D2D-eNB links and D2D-cellular links, and decide, based upon the information, which cellular UE can share the resource with which D2D link without imposing harmful or unbearable interference on each other.

For example, after the channel measurements, the BS 101 may select cellular UEs 102 and 103 as candidates to reuse resources with the target D2D link, i.e., a link established between the D2D master UE 104 and the D2D slave UE 105. Thereby, the scheduling as performed by the BS 101 may include scheduling the D2D master UE 104 and D2D slave UE 105 to perform the D2D communication on the radio resource shared by the cellular UEs 102 and 103. This scheduling would be carried out by transmitting to the D2D UEs resource allocation information in which usable resources and their positions in the various domains (e.g., time and frequency domains) are indicated. Thereafter, the D2D master UE 104 and the D2D slave UE 105 may be scheduled to communicate with each other on the allocated resources which are shared by the cellular UEs 102 and 103, as illustrated at steps S403, S404, and S405. In this manner, the BS 101 may accomplish initial resource allocation for the D2D link.

In addition to transmitting resource allocation information to the D2D UEs 104 and 105, according to the embodiments of the present invention, assistance information is also sent. By means of such assistance information, the embodiments of the present invention differentiate or divide resources conveyed by the resource allocation information into different types based upon correspondingly different interference sources. As discussed previously, the interference sources may include cellular UEs (e.g., cellular UEs 102 and 103 in this example) in a same cell (e.g., the Cell 1) as the two D2D UEs 104 and 105 or cellular UEs (e.g., the cellular UE 107) in a neighboring cell (e.g., the Cell 2) relative to a serving cell (e.g., the Cell 1) of the two D2D UEs 104 and 105. Additionally or alternatively, the interference sources may include different D2D UEs in other D2D communication in a same cell as the two D2D UEs 104 and 105 or different D2D UEs (e.g., the D2D UEs 108 and 109 in the Cell 2) in a neighboring cell relative to the serving cell of the two D2D UEs 104 and 105.

The assistance information may take one of the following formats or approaches to transmit or indicate to the D2D UE, as non-limiting examples.

a) It could be an independent field of the resource grant DCI, e.g., a 3-bit field that allows differentiating up to 7 cellular or D2D UEs. For example, bits 000 denote idle resources, bits 001 denote resources being used by the cellular UE 102 and bits 010 denote resources being used by the cellular UE 103. It should be noted that this field is only for differentiating different types of resources for an RRM decision and that it is unnecessary to have explicit information about the cellular UE C-RNTI.

b) It could be sent via other field implicitly. For example, the UL RS CS information may be sent to the D2D UE to enable interference-channel information. Therefore, if an implicit one-to-one mapping is established between the CS and the UE index, e.g., each reusing cellular UE using a dedicate CS, then the CS field can be used as UE indexes to D2D UEs. For example, CS=1 means this resource is used by the cellular UE 102 and CS=2 means this resource is used by the cellular UE 103, and so forth.

c) It could be derived from other information. For instance, if the BS 101 only pairs semi-persistent scheduled cellular UEs with D2D UEs, then different semi-persistent resource groups means different cellular UEs. Then, different resource groups can refer to different cellular UEs.

With respect to the interference sources such as the D2D UEs in a same serving cell (e.g., the Cell 1), and the D2D and cellular UEs in a neighboring cell (e.g., the Cell 2), the assistance information can be extended to include information in regards to such kinds of different interference sources.

For instance, with respect to the same serving cell, there can be information for denoting interference from other D2D UEs. In an embodiment, it could be just one bit to denote whether other D2D UEs are reusing the same resource. In another embodiment, there could be more than one bit to denote different grouping of multiple D2D links. In this way, each pairing may denote a fixed D2D link group for which the interference level would be relatively stable. This implementation would be helpful in a scenario where multiple D2D links are reusing the same resources.

Likewise, there can be information for denoting interference from neighboring cells. In one embodiment, it could be just one bit to denote whether there are other cellular UEs and/or D2D UEs reusing the same resource in the neighboring cell. In another embodiment, there may be more than one bit to denote different cellular UEs and/or D2D UEs in the neighboring cell. This implementation would be helpful for D2D links at the edge of the cells.

It is to be understood from the above description that the assistance information according to the embodiments of the present invention may explicitly or implicitly indicate different interference sources. Additionally, the assistance information may also comprise an index indicative of a type of resources which are idle in the network. Further, the assistance information may comprise respective dedicated RS CS information or respective semi-persistent resource scheduling information of the different interference sources so as to implicitly indicate the different interference sources.

The foregoing has discussed the assistance information of the embodiments of the present invention. Now returning to FIG. 4, the method 400 proceeds to step S406, at which the D2D master UE 104 and D2D slave UE 105 have been engaged in the D2D communication and may send to each other corresponding ACKs or NACKs for indicating successful or unsuccessfully receipt of data transmissions in respective upstream and downstream directions via respective different types of resources indicated by different interference source. The method 400 then proceeds to step S407, at which the D2D slave UE 105 transmits to the D2D master UE 104 a respective CQI formed from the respective type of resource. Then, the method 400 advances to step S408, at which the D2D master UE 104 accomplishes the LA with respect to each kind of interference source based upon the assistance information and the respective channel quality information comprising information regarding the respective CQI, the respective ACK or the respective NACK to receipt of the respective D2D communication on the respective different types of resources. Details regarding how the D2D master UE 104 autonomously accomplishes the LA are discussed hereinafter by way of example.

Suppose that there are three types of resources: 1) idle resources, 2) resources shared with cellular UE 102; and 3) resources shared with cellular UE 103. As discussed before, because the D2D pair (i.e., the D2D master UE 104 and the D2D slave UE 105) can differentiate these resources by the assistance information from the BS 101, then there would be independent or separate CQIs and ACK/NACK feedbacks to enable independent LA procedures, i.e., interference-specific LA procedures.

In more details, the algorithm of the CQI and ACK/NACK based LA is similar to the current implementation of the cellular DL LA and thus can be described briefly in the following steps:

Step 1: an Rx estimates radio link quality to calculate and report a CQI to a Tx;

Step 2: the received CQI is mapped to a specific MCS scheme by the Tx;

Step 3: furthermore, based upon the received ACK/NACK feedbacks from the Rx, the Tx adjusts the MCS scheme as an outer loop adjustment.

It can be noted that the use of the assistance information enables independent LA threads for different types of resources, e.g., the resources 1, 2, and 3. In other words, the CQI calculation, CQI mapping to the MCS, and ACK/NACK based outer-loop adjustment is done with respect to each resource type individually. It should also be noted that the embodiments of the present invention are not limited to the specific algorithms of the LA and any suitable LA procedures can be applied in the present invention as appropriate.

Upon completion of the LA at step S408, the method 400 advances to step S409, at which the D2D master UE 104 sends an LA decision or result for the upstream transmission to the D2D slave UE 105. Based upon this LA decision, the D2D slave UE 105 can use an appropriate MCS scheme to conduct the forthcoming D2D communication.

Afterwards, the method 400 proceeds to step S410, at which the D2D master UE 104 sends at least one report to the BS 101. Because the resource allocation and the LA are performed at the BS 101 and the D2D master UE 104, respectively, the BS has no knowledge of how many bits can be carried by one radio resource. Thus, it is necessary for the D2D master UE 104 to report, as the result of the LA, such information to the BS 101. According to the embodiments of the present invention, this report can take one of the following forms:

a) A new BSR: instead of the current BSR definition which is "the number of bits in the buffer," this new BSR is defined as "the amount of physical resources needed to clear the D2D buffer," which can be used to include the LA-related information. By changing the conventional bit-size of BSR to resource-size according to the LA, this new type of BSR combines the conventional BSR with the LA-related information together and can thus be used by the BS 101 to allocate resources in the system directly.

b) Additional resource-size per bit information: this information may also relate to the amount of occupied resource-size per bit. In this way, the BSR information and LA-related information is separated so as to provide more flexibility in reporting pattern setting and provide more accuracy to quantify each item.

c) CQI information: it could be simply CQI information, but reported with a larger time scale than in the conventional network.

It can be understood from the above description that the D2D master UE 104 may report, subsequent to the respective LA, to the BS 101 to indicate a mapping relationship between a physical resource and a data bit as a result of the respective LA. In an embodiment, the report may comprise information regarding the number of physical resources to be needed to clear a transmit buffer of the at least one of the two D2D UEs. In another embodiment, the report may comprise information regarding the number of physical resources occupied per bit or the number of data bits carried per physical resource.

The report as discussed above may take different forms and could be formed in any feasible manners. For instance, because the assistance information from the BS 101 can be used by the D2D UEs to differentiate resources for different interference sources (due to different interfering cellular/D2D UEs in the serving/neighboring cells), the report may also be in multiple versions for the different interference sources. Take cellular UE indexes as an example, there may be a respective report for each of different cellular UE indexes, as indicated in the assistance information in the scheduling command from the BS 101. Additionally or alternatively, there could be only one single report, irrespective of the different interference sources.

Due to the interference/channel variation on the time/frequency scale, some filtering operations are needed to combat with it before the reporting. These filtering operations could be accomplished by some algorithms. These algorithms may include but are not limited to a conservative algorithm which is based upon "minimum SINR" and/or "maximum interference," and a low-pass filter based algorithm similar to conventional RSRP reporting, which is roughly an averaging operation. In other words, according to the embodiments of the present invention, prior to the reporting, it is determined that how many resources are needed based upon at least one of a minimum SINR algorithm, a maximum interference algorithm, and a low-pass filter based algorithm.

Upon receipt of the report from the D2D master UE 104, the BS 101 may adjust the resource allocation decision. For example, the BS 101 may determine from the report that the D2D UEs 104 and 105 reusing the resources only with the cellular UE 103 can provide sufficient resources for D2D traffic QoS, and then decide to abandon scheduling the D2D UE to reuse the resource with the cellular UE 102. Thereafter, the BS 101 sends the adjusted scheduling command, implicitly denoting resources co-scheduled with the cellular UE 103 only, to the D2D master UE 104, D2D slave UE 105, and the cellular UE 103 at steps S411, S412, and S413, respectively. Thereby, at steps S414 and S415, the D2D master UE 104 and the D2D slave UE 105 may be engaged in the D2D communication on the radio resources reused by the cellular UE 103.

The foregoing has discussed the embodiments of the present invention in one possible order, it should be noted that this order is merely illustrative of the present invention. A person skilled in the art can understand that the embodiments of the present invention can be carried out in any suitable orders. With the method 400, not only the efficiency of the LA but also the scheduling of resource allocation can be improved. Further, the D2D UEs can determine potential interferers and avoid them so that the inter-cell or intra-cell interference that would be generated by the potential interferers can be avoided. Thus, D2D UEs can autonomously decide which resources should be prohibited to avoid inter-cell or intra-cell interference from other cellular UEs or D2D UEs.

Figure 5:
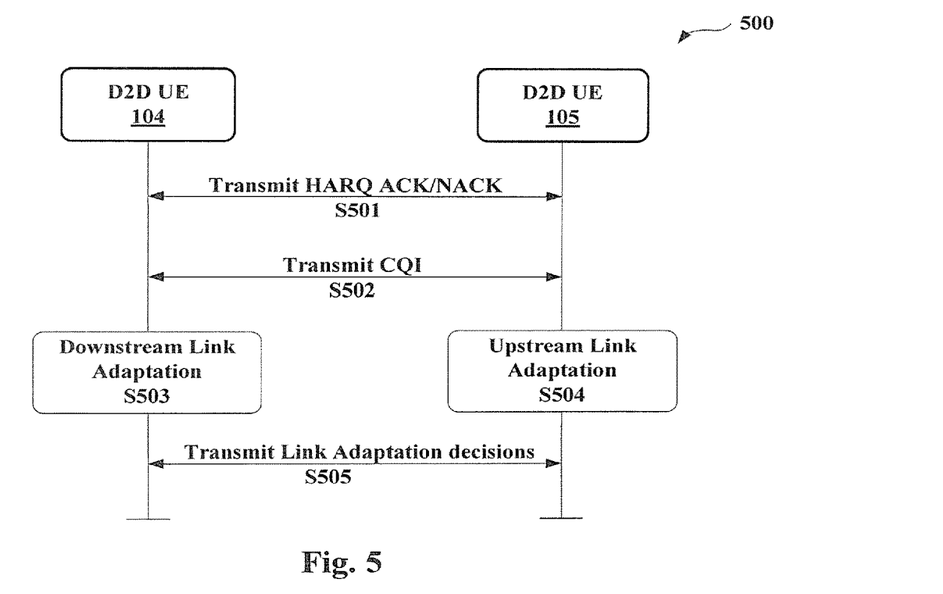
FIG. 5 schematically illustrates a simplified signaling flow for a method for LA in a hybrid D2D and cellular network according to one embodiment of the present invention.

FIG. 5 schematically illustrates a simplified signaling flow for a method 500 for LA in a hybrid D2D and cellular network according to one embodiment of the present invention. It should be noted that the method 500 is merely a variant of the method 400 and thus only the differences regarding performance of the LA are discussed below. The same or similar steps, such as the initial resource allocation, the reporting, the updating of the resource allocation, are not discussed herein for concise purposes.

As illustrated in FIG. 5, at step S501, the D2D UE 104 and the D2D UE 105 may receive, at step S501, the HARQ ACK/NACK feedback results transmitted from the D2D UE Rx (i.e., the respective receiving party in the D2D communication) and receive the CQI at step S502. As discussed before with respect to the method 400, combining the information regarding different interference sources (e.g., index information with respect to each cellular UE) from the BS 101, the CQI and the ACK/NACK result feedbacks from the Rx, the D2D UE (104 and 105 in this example embodiment) Tx can accomplish the LA for each cellular UE (or other types of interference sources) separately. In particular, the D2D UE 104 is in charge of downstream LA at step S503 and D2D UE 105 would likewise be in charge of upstream LA at step S504. Upon completion of the downstream and upstream LAs, the D2D UEs 104 and 105 may send, at step S505, the respective LA decision to one another (i.e., to the D2D UE Rx in the D2D communication) before real data transmission such that the Rx can determine how to process (e.g., demodulate) the received D2D communication data due to an updated or adjusted MCS, if any. After that, the D2D UE 104 and D2D UE 105 may report to the BS 101 the results of the LAs and thus the BS 101 may update the scheduling scheme based upon the results, as discussed in detail before in connection with FIG. 4.

Figure 6:
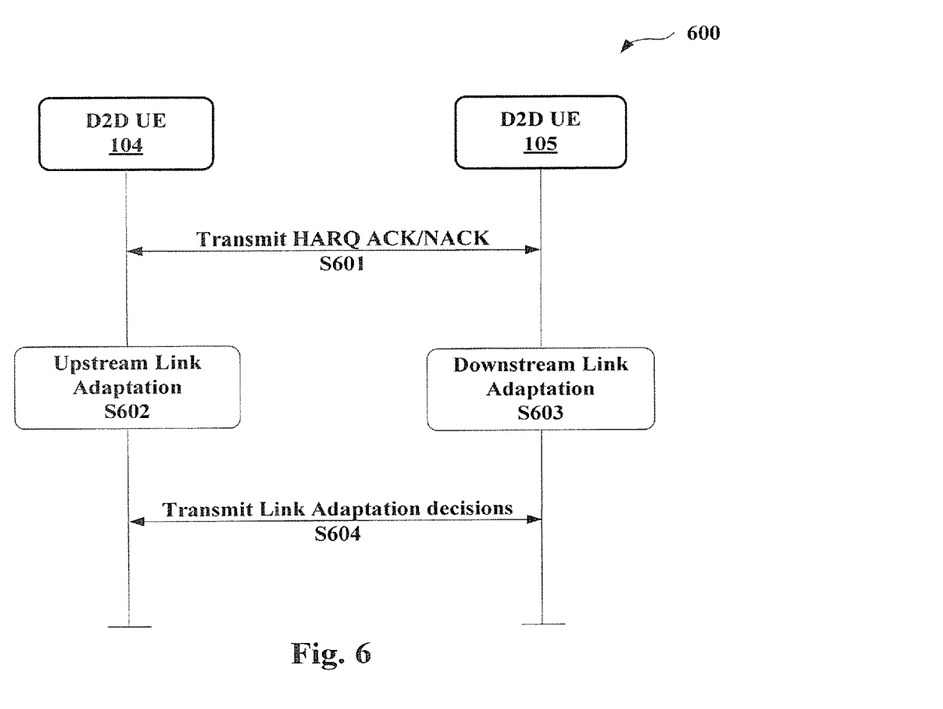
FIG. 6 schematically illustrates a simplified signaling flow for a method for LA in a hybrid D2D and cellular network according to another embodiment of the present invention.

FIG. 6 schematically illustrates a simplified signaling flow for a method 600 for LA in a hybrid D2D and cellular network according to another embodiment of the present invention. It should be noted that the method 600 is merely another variant of the method 400 and thus only the differences regarding performance of the LA are discussed below. The same or similar steps, such as the initial resource allocation, the reporting, the updating of the resource allocation, are not discussed herein for concise purposes.

As illustrated in FIG. 6, at step S601, the D2D UE 104 and the D2D UE 105 may obtain from the D2D UE Tx the HARQ ACK/NACK feedback results at step S601. As discussed before with respect to the method 400, combining the information regarding different interference sources from the BS 101 and the ACK/NACK result feedbacks from the Tx, the D2D UE Rx can accomplish the LA for each cellular UE (or other types of interference sources) separately. In particular, the D2D UE 104 is in charge of upstream LA at step S602 and the D2D UE 105 would likewise be in charge of downstream LA at step S603. After that, the LA decisions can be sent to the D2D UE Tx at step S604 before real data transmission, i.e., from the D2D UE 104 to the D2D UE 105 for D2D downstream transmission, and from the D2D UE 105 to the D2D UE 104 for D2D upstream transmission, similar to step S505 as illustrated in FIG. 5. Thereafter, the D2D UE 104 and the D2D UE 105 may report to the BS 101 the results of the LAs and thus the BS 101 may update the scheduling scheme based upon the results, as discussed in detail before in connection with FIG. 4. It is to be understood that the LA in this embodiment is decided and performed by the Rx of the D2D UE and that the information regarding the channel quality is self-obtainable. Therefore, the step of obtaining the CQI is unnecessary in FIG. 6, which is different from FIG. 5.

It can be understood from the above methods 500 and 600 that the embodiments of the present invention provide various alternatives for implementing the LA and these alternatives can be easily and flexibly implemented without departing from the spirit and scope of the embodiments of the present invention.

Figure 7:
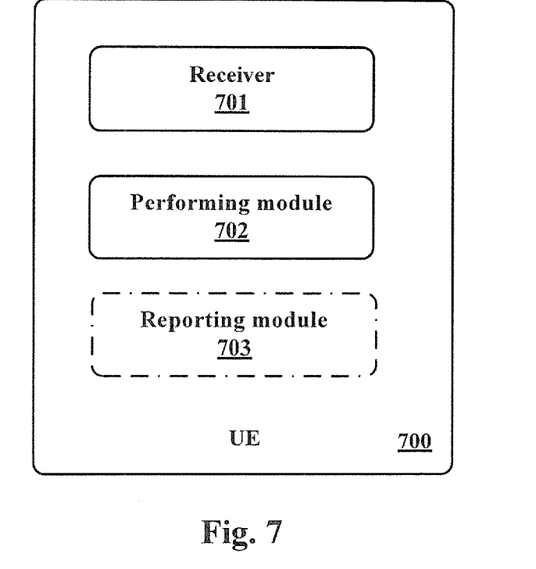
FIG. 7 is a simplified schematic block diagram illustrating a UE according to one embodiment of the present invention.

FIG. 7 is a simplified schematic block diagram illustrating a UE 700 for LA in the hybrid D2D and cellular network as shown in FIG. 1, according to one embodiment of the present invention. As illustrated in FIG. 7, the UE 700 may at least include a receiver 701 and a performing module 702, and optionally a reporting module 703. The receiver 701 is adapted to receive resource allocation information for D2D communication and assistance information from a BS (e.g., BS 101), wherein the assistance information is used to divide resources conveyed by the resource allocation information into different types based upon correspondingly different interference sources. It can be seen that the receiver 701 is able to perform the step S201 as recited in the method 200. The performing module 702 is adapted to perform respective LA based upon the respective different types of resources. It can be seen that the performing module 702 is able to perform the steps S203, S408, S503, S504, S603, and S604 as recited in the methods 200, 400, 500, and 600, respectively. The reporting module 703 is adapted to report, subsequent to the respective LA, to the BS to indicate a mapping relationship between a physical resource and a data bit as a result of the respective LA. It is to be understood that the reporting module 703 is able to perform the reporting steps as recited in the methods 200 and 400.

Figure 8:
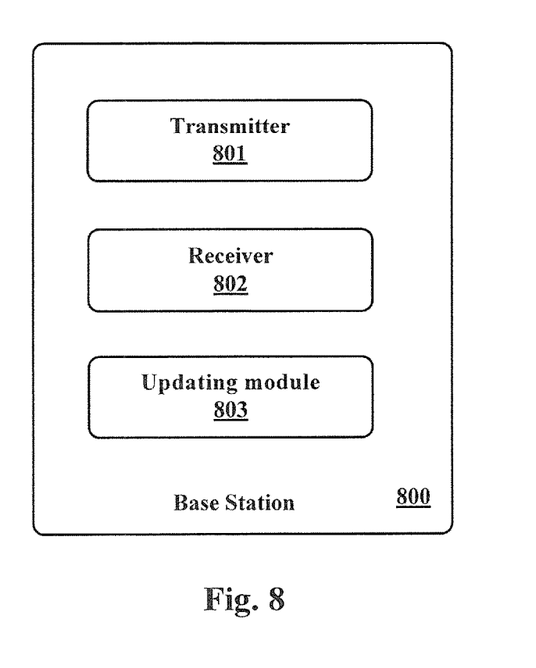
FIG. 8 is a simplified schematic block diagram illustrating a BS according to another embodiment of the present invention.

FIG. 8 is a simplified schematic block diagram illustrating a BS 800 for LA in the hybrid D2D and cellular network as shown in FIG. 1, according to one embodiment of the present invention. As illustrated in FIG. 8, the BS 800 may at least include a transmitter 801, a receiver 802 and an updating module 803. The transmitter 801 is adapted to transmit, resource allocation information and assistance information to at least one D2D UE in D2D communication, wherein the assistance information is used to divide resources conveyed by the resource allocation information into different types based upon correspondingly different interference sources. It can be seen that the transmitter 801 is able to perform the step S302 as recited in the method 300. The receiver 802 is adapted to receive, from the at least one D2D UE, at least one report resulted formed respective LA performed by the at least one D2D UE, wherein the respective LA has been performed based upon the respective different types of resources. It can be seen that the receiver 802 is able to perform the steps S303 as recited in the method 300. The updating module 803 is adapted to update the resource allocation information based upon at least one report. It is to be understood that the updating module 803 is able to perform the step S304 as recited in the methods 3.

With the UE 700 and BS 800 according to the embodiments of the present invention, high quality D2D communication links can be achieved and meanwhile radio resources can be efficiently allocated, thereby giving D2D communication traffic a big boost.

It will be appreciated that the invention may be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the specification do not imply any specific order in which the features/steps must be worked. Rather, the steps/features may be performed in any suitable order.

The terminology used herein is for the purpose of describing particular embodiments only and is not intended to limit to the invention. As used herein, the singular forms "a," "an" and "the" are intended to comprise the plural forms as well, unless otherwise stated. It will be further understood that the terms "including," "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

What is claimed is:

1. A method for link adaptation in a hybrid device-to-device (D2D) and cellular network, the method comprising:

receiving, by at least one of two D2D user equipment in D2D communication, resource allocation information and assistance information from a base station, wherein the assistance information is used to divide resources conveyed by the resource allocation information into different types based upon correspondingly different interference sources, and wherein the assistance information comprises indications to differentiate idle resources, resources receiving interference from cellular user equipments, and resources receiving interference from other D2D user equipments; and performing, by the at least one of the two D2D user equipment in D2D communication, respective link adaptation based upon the respective different types of resources identified by the assistance information.

2. The method as in claim 1, wherein the different interference sources comprise at least one of the following:

different cellular user equipment in a same cell as the two D2D user equipment or in a neighboring cell relative to a serving cell of the two D2D user equipment; and different D2D user equipment in other D2D communication in a same cell as the two D2D user equipment or in a neighboring cell relative to the serving cell of the two D2D user equipment.

3. The method as in claim 1, wherein performing respective link adaptation based upon the respective different types of resources comprises performing the respective link adaptation based upon respective channel quality information obtained from the respective D2D communication on the respective different types of resources.

4. The method as in claim 3, wherein the respective channel quality information comprises information regarding a channel quality indicator and one of an acknowledgement and a negative acknowledgement to receipt of the respective D2D communication on the respective different types of resources.

5. The method as in claim 1, further comprising:

reporting, subsequent to the respective link adaptation, to the base station to indicate a mapping relationship between a physical resource and a data bit as a result of the respective link adaptation.

6. The method as in claim 1, wherein performing the respective link adaptation comprises performing at least one of respective upstream and downstream link adaptation by one of the two D2D user equipment acting as a master device in the D2D communication.

7. A method for link adaptation in a hybrid device-to-device (D2D) and cellular network, the method comprising:

transmitting, by a base station, resource allocation information and assistance information to at least one D2D user equipment in D2D communication, wherein the assistance information is used to divide resources conveyed by the resource allocation information into different types based upon correspondingly different interference sources, and wherein the assistance information comprises indications to differentiate idle resources, resources receiving interference from cellular user equipments, and resources receiving interference from other D2D user equipments;

receiving, from the at least one D2D user equipment, at least one report resulted from respective link adaptation performed by the at least one D2D user equipment, wherein the respective link adaptation has been performed based upon the respective different types of resources identified by the assistance information; and updating the resource allocation information based upon the at least one report.

8. The method as in claim 7, wherein the different interference sources comprise at least one of the following:

different cellular user equipment in a same cell as the at least one D2D user equipment or in a neighboring cell relative to a serving cell of the at least one D2D user equipment; and different D2D user equipment in other D2D communication in a same cell as the at least one D2D user equipment or in a neighboring cell relative to the serving cell of the at least one D2D user equipment.

9. The method as in claim 7, wherein the at least one report indicates a mapping relationship between a physical resource and a data bit as a result of the respective link adaptation.

10. A user equipment, comprising:

a receiver to receive resource allocation information for device-to-device (D2D) communication and assistance information from a base station, wherein the assistance information is used to divide resources conveyed by the resource allocation information into different types based upon correspondingly different interference sources, and wherein the assistance information comprises indications to differentiate idle resources, resources receiving interference from cellular user equipments, and resources receiving interference from other D2D user equipments; and a performing module to perform respective link adaptation based upon the respective different types of resources identified by the assistance information.

11. The user equipment as in claim 10, wherein the different interference sources comprise at least one of the following:

different cellular user equipment in a same cell as the user equipment or in a neighboring cell relative to a serving cell of the user equipment; and different D2D user equipment in other D2D communication in a same cell as the user equipment or in a neighboring cell relative to the serving cell of the user equipment.

12. The user equipment as in claim 10, further comprising:

a reporting module to report, subsequent to the respective link adaptation, to the base station to indicate a mapping relationship between a physical resource and a data bit as a result of the respective link adaptation.

13. A base station, comprising:

a transmitter to transmit resource allocation information and assistance information to at least one D2D user equipment in device-to-device (D2D) communication, wherein the assistance information is used to divide resources conveyed by the resource allocation information into different types based upon correspondingly different interference sources, and wherein the assistance information comprises indications to differentiate idle resources, resources receiving interference from cellular user equipments, and resources receiving interference from other D2D user equipments;

a receiver to receive, from the at least one D2D user equipment, at least one report resulted from respective link adaptation performed by the at least one D2D user equipment, wherein the respective link adaptation has been performed based upon the respective different types of resources identified by the assistance information; and an updating module to update the resource allocation information based upon the at least one report.

14. The base station as in claim 13, wherein the different interference sources comprise at least one of the following:

different cellular user equipment in a same cell as the at least one D2D user equipment or in a neighboring cell relative to a serving cell of the at least one D2D user equipment; and different D2D user equipment in other D2D communication in a same cell as the at least one D2D user equipment or in a neighboring cell relative to the serving cell of the at least one D2D user equipment.

15. The base station as in claim 13, wherein the at least one report indicates a mapping relationship between a physical resource and a data bit as a result of the respective link adaptation.

* * * * *